(12) United States Patent
Elliott et al.

(10) Patent No.: US 6,850,161 B1
(45) Date of Patent: Feb. 1, 2005

(54) SYSTEMS AND METHODS FOR IDENTIFYING AND MAPPING CONDUIT LOCATION

(75) Inventors: Brig Barnum Elliott, Arlington, MA (US); Jerry Burchfiel, Waltham, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 70 days.

(21) Appl. No.: 09/963,702

(22) Filed: Sep. 26, 2001

Related U.S. Application Data

(60) Provisional application No. 60/242,599, filed on Oct. 23, 2000.

(51) Int. Cl.[7] .............................................. G08B 13/14
(52) U.S. Cl. ............................. 340/572.1; 340/572.4; 340/572.7; 340/539.1; 340/825.49; 340/853.5; 340/853.9
(58) Field of Search ....................... 340/572.1, 572.4, 340/572.7, 539.1, 853.5, 853.9, 825.45, 825.54, 825.49

(56) References Cited

U.S. PATENT DOCUMENTS

| | | | |
|---|---|---|---|
| 4,652,861 A | * | 3/1987 | Domes ........................ 340/572 |
| 4,767,237 A | | 8/1988 | Cosman et al. |
| 5,014,008 A | | 5/1991 | Flowerdew |
| 5,017,415 A | | 5/1991 | Cosman et al. |
| 5,043,666 A | | 8/1991 | Tavernetti et al. |
| 5,114,517 A | | 5/1992 | Rippingale et al. |
| 5,116,654 A | | 5/1992 | Cosman et al. |
| 5,173,139 A | | 12/1992 | Rippingale et al. |
| 5,206,065 A | | 4/1993 | Rippingale et al. |
| 5,296,850 A | * | 3/1994 | King ..................... 340/825.49 |
| 5,305,411 A | | 4/1994 | Arroyo |
| 5,361,029 A | * | 11/1994 | Rider et al. .................. 324/326 |
| 5,430,379 A | | 7/1995 | Parkinson et al. |
| 5,463,838 A | | 11/1995 | Collier |
| 5,532,598 A | * | 7/1996 | Clark, Jr. et al. ........... 340/551 |
| 5,557,258 A | * | 9/1996 | Eslambolchi ............... 340/540 |
| 5,563,583 A | | 10/1996 | Brady et al. |
| 5,577,147 A | | 11/1996 | Arroyo et al. |
| 5,635,907 A | * | 6/1997 | Bernard et al. ............. 340/573 |
| 5,704,189 A | | 1/1998 | Collier |
| 5,720,354 A | * | 2/1998 | Stump et al. ............ 340/853.5 |
| 5,724,425 A | * | 3/1998 | Chang et al. ................. 380/25 |
| 6,092,558 A | | 7/2000 | Maccario |
| 6,176,425 B1 | * | 1/2001 | Harrison et al. ............ 235/385 |
| 6,229,445 B1 | | 5/2001 | Wack |
| 6,374,746 B1 | * | 4/2002 | Fiske .......................... 104/28 |
| 6,377,203 B1 | * | 4/2002 | Doany ....................... 340/10.1 |
| 6,405,135 B1 | * | 6/2002 | Adriany et al. ................ 702/5 |

* cited by examiner

*Primary Examiner*—Daniel J. Wu
*Assistant Examiner*—Hung Nguyen
(74) *Attorney, Agent, or Firm*—Leonard Suchyta, Esq.; Joel Wall, Esq.; Finnegan Henderson, et al.

(57) ABSTRACT

A system (100) for mapping an underground object (145) includes a conduit location recording device 105 and a server (115). The conduit location recording device (105) senses an underground object (145), a unique identifier being associated with the sensed underground object (145), and determines a location of the underground object (145). The conduit location recording device (105) transmits, via a communications network (125), the unique identifier and determined location to the server (115) for storage in a database.

22 Claims, 10 Drawing Sheets

FIG. 6

| OWNER ID 605 | CONDUIT ID 610 | CONDUIT MARKER ID 615 | MARKER GEO-LOCATION 620 | TIME STAMP 625 |
|---|---|---|---|---|

| OWNER ID 605 | CONDUIT ID 610 | CONDUIT MARKER ID 615 | MARKER GEO-LOCATION 620 | TIME STAMP 625 | CONDUIT IN-USE STATUS 805 | GEO-DATA 810 | OWNER CONTACT DATA 815 |
|---|---|---|---|---|---|---|---|

800

SYSTEMS AND METHODS FOR IDENTIFYING AND MAPPING CONDUIT LOCATION

RELATED APPLICATION

This application claims priority under 35 U.S.C. §119 based on U.S. Provisional Application No. 60/242,599 filed Oct. 23, 2000, the disclosure of which is incorporated herein by reference.

FIELD OF THE INVENTION

The present invention relates generally to subsurface object identification mechanisms and, more particularly, to systems and methods for identifying, locating and mapping subsurface objects.

BACKGROUND OF THE INVENTION

Utility companies often need to excavate in order to lay new conduits, such as cables, pipes or ducts, or in order to repair existing conduits. To avoid disrupting the underground equipment of other utility companies, an excavating utility company must now generally follow "dig safe" procedures. In such procedures, the excavating utility announces their digging plans to a central agency. This central agency inspects records that it maintains of the conduits of other utilities that have been buried in the area that is to be excavated. The central agency relays the planned excavation to any affected utilities. These affected utilities then send out people to mark the exact locations of their buried conduits by spraying paint at appropriate locations on the ground. After this process is complete, the excavating utility company may begin digging with some assurances that it will not accidentally dig up other utilities' conduits. As is apparent, this "dig safe" process can be both labor-intensive and costly, and can cause delays in excavation projects.

Therefore, there exists a need for systems and methods that can eliminate the costly and labor-intensive procedures involved with the conventional "dig safe" process employed when an entity desires to excavate.

SUMMARY OF THE INVENTION

Systems and methods consistent with the present invention address this need and others by providing mechanisms that can identify, locate and map subsurface objects, such as conduits that may include cables, pipes and ducts, in an efficient and less labor intensive manner. Systems and methods consistent with the present invention can identify markers, such as Radio Frequency Identifier (RFID) tags or magnetic markers that are affixed to buried or subsurface objects and can determine the geo-location of the identified markers. Marker identification and geo-location data can then be transmitted, via a wireless network, to a central data storage facility, such as a data server, for storage. The stored subsurface object data can be retrieved by interested entities such as utility companies that are excavating a particular geographic area containing one or more subsurface objects.

In accordance with the purpose of the invention as embodied and broadly described herein, a method for mapping an underground object includes sensing an underground object, a unique identifier being associated with the sensed underground object; determining a location of the underground object; and transmitting, via a communications network, the unique identifier and determined location to a data storage device.

In another implementation consistent with the present invention, a method for identifying and locating an underground object includes sensing the underground object, a unique identifier being associated with the sensed underground object, transmitting, via a communications network, a data request comprising the unique identifier to a server, and receiving data associated with the underground object from the server.

In a further implementation consistent with the present invention, a method of notifying an entity of a request for data relating to an underground object includes sensing the underground object, a unique identifier being associated with the sensed underground object; transmitting to a data storage facility, via a communications network, a data request comprising the unique identifier; and notifying the entity of the data request, the notification comprising the unique identifier.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6 and 8 illustrate exemplary records stored in the databases of FIGS. 5 and 7, respectively, consistent with the present invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for identifying, locating and mapping subsurface objects, and storing subsurface object identification and location data in a central database that can be accessed via a wireless communications network. Subsurface objects can be identified, consistent with the present invention, through the use of markers such as RFID tags or magnetic markers, that are affixed to buried or subsurface objects.

Exemplary System

Figure 1:
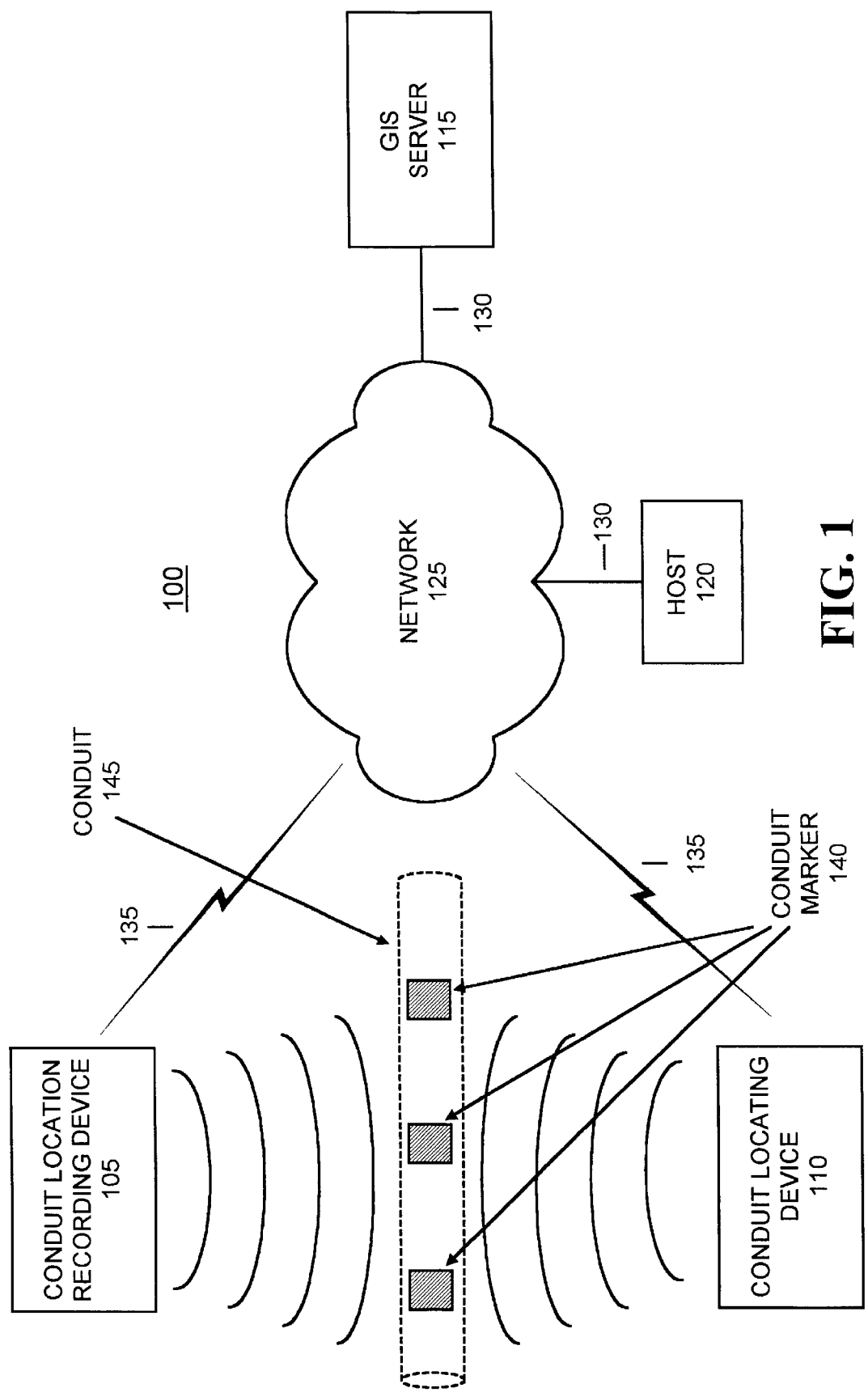
FIG. 1 illustrates an exemplary system for mapping and identifying conduits consistent with the present invention.

FIG. 1 illustrates an exemplary system 100, consistent with the present invention, for identifying and mapping conduits. System 100 may include a conduit location recording device 105, a conduit locating device 110, a Geographic Information System (GIS) server 115, and a host 120 interconnected with a network 125 via wired 130, wireless 135, or optical connection links (not shown). System 100 may further include conduit markers 140 affixed to one or more conduits 145.

Conduit location recording device 105 and conduit locating device 110 may be similarly constructed and may include conventional circuitry for implementing mobile communications. Conduit location recording device 105 may map geo-locations of conduit markers 140 and may transmit the mapped locations to GIS server 115 via network 125. Conduit locating device 110 may identify conduit markers 140 and their corresponding geo-locations, and may transmit the identifiers and geo-locations to GIS server 115 via network 125.

GIS server 115 may include one or more conventional servers that can communicate with devices 105 and 110 and host 120 via network 125. Host 120 may include a conventional computer, such as a desktop, laptop or the like. Host 120 may be operated by an entity, such as a utility company, desiring to retrieve data associated with a specific conduit or geographic location from database 700 of GIS server 115, as described in more detail below. An owner of a conduit may also, for example, operate host 120 to update specific data related to that conduit that has been stored in database 700 of GIS server 115, such as the in-use status of the conduit.

Network 125 can include one or more networks of any type, including a private land mobile network, Public Land Mobile Network (PLMN), Public Switched Telephone Network (PSTN), two-way paging network, satellite communications network, local area network (LAN), metropolitan area network (MAN), wide area network (WAN), Internet, Intranet, or any type of specialized radio-communications network. The one or more PLMNs may further include packet-switched sub-networks, such as, for example, General Packet Radio Service (GPRS), Cellular Digital Packet Data (CDPD), and Mobile IP sub-networks.

Conduit markers 140 may include devices that provide conduit identifiers through, for example, magnetic or electromagnetic means. Conduit markers 140 may include any type of conventional Radio Frequency Identifying (RFID) tags, such as, for example, those disclosed in U.S. Pat. Nos. 6,229,445 and 5,017,415. These RFID tags may include, for example, small metal particles embedded in, or on, an electrically non-conductive material. For example, theses particles may include metal-coated rods cut to a size that permits them to be used as bipolar antennas matched to a predetermined frequency. The metal-coated rods may be randomly distributed within the RFID tags such that when a RF signal is applied to the RFID tag, the electromagnetic energy will react with the randomly distributed antennas to produce a unique reflected signature of the RFID tag. Therefore, when the RF signal is applied to the RFID tag, the signature of the reflected portion of the RF signal can be read to uniquely identify the conduit marker 140. Conduit markers 140 may, additionally, include any type of conventional magnetic identifying markers, such as, for example, those disclosed in U.S. Pat. Nos. 5,114,517, 5,577,147, or 6,092,558.

Figure 2:
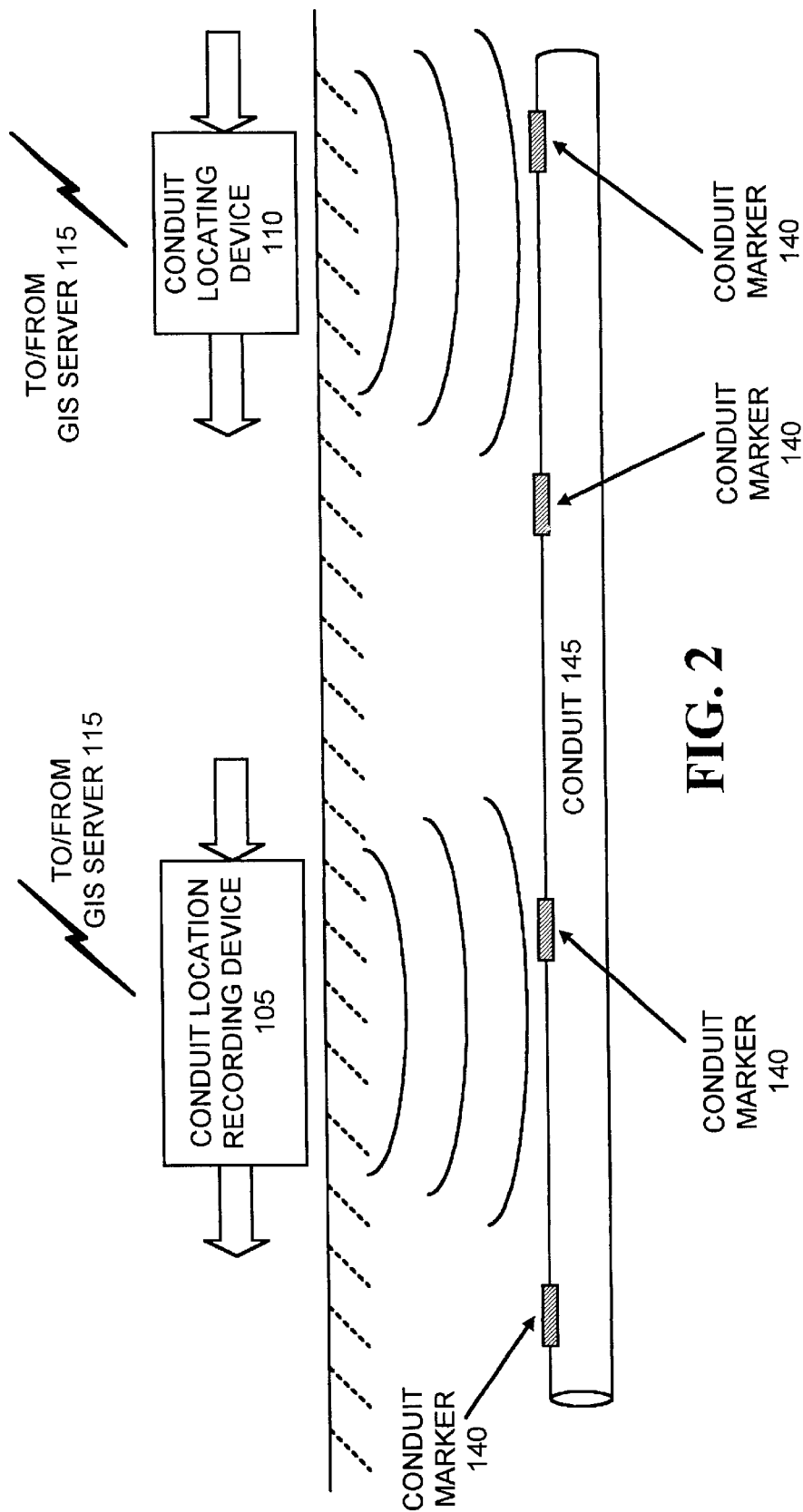
FIG. 2 illustrates an exemplary operation of the system of FIG. 1 consistent with the present invention.

FIG. 2 illustrates exemplary operation of system 100. As shown, conduit location recording device 105 can be carried/transported over an area under which a conduit 145 may be buried. Conduit location recording device 105 may sense, via magnetic or electromagnetic means, identifiers for conduit markers 140 that may have been affixed to conduit 145 at specified intervals. Conduit location recording device 105 may then determine a geo-location for each sensed conduit marker 140 and transmit the sensed identifier and geo-location for each conduit marker 140 to GIS server 115.

Conduit locating device 110, similarly, can be carried/transported over an area under which a conduit 145 may be buried. Conduit locating device 110 also may sense, via magnetic or electromagnetic means, identifiers for conduit markers 140 that have been affixed to conduit 145 at specified intervals. Conduit locating device 110 may transmit the sensed identifiers for each conduit marker 140 to GIS server 115 to retrieve previously stored conduit related data, such as, for example, mapped geographical data that indicates the location of a conduit, data indicating the owner of a conduit, and/or data that indicates an in-use status of a conduit.

Exemplary Conduit Location Recording/locating Device

Figure 3:
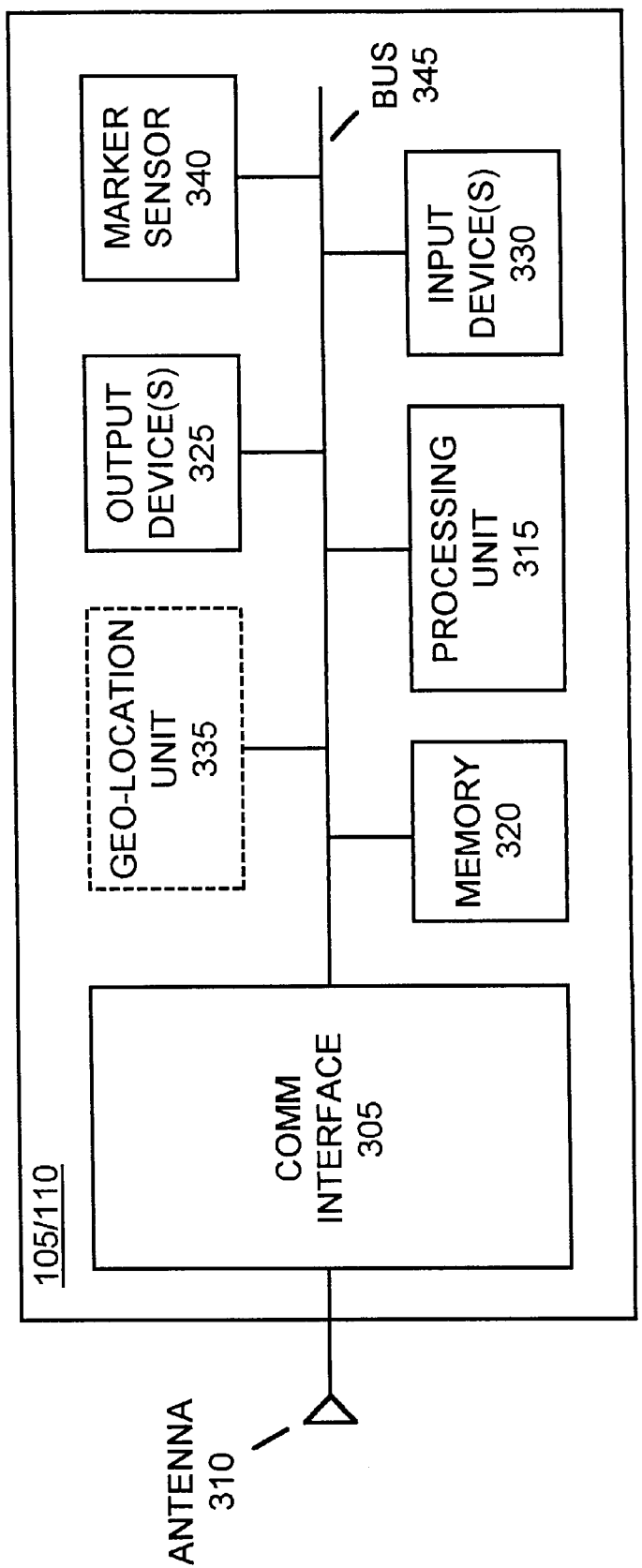
FIG. 3 illustrates an exemplary conduit location recording device/conduit locating device consistent with the present invention.

FIG. 3 illustrates exemplary components of conduit location recording device 105 consistent with the present invention. Conduit locating device 110 may be similarly configured. Conduit location recording device 105 may include a communication interface 305, an antenna 310, a processing unit 315, a memory 320, an output device(s) 325, an input device(s) 330, an optional geo-location unit 335, a marker sensor 340, and a bus 345.

Communication interface 305 may connect conduit location recording device 105 to another device or network, such as network 125. For example, communication interface 305 may include transceiver circuitry well known to one skilled in the art for transmitting and/or receiving data bursts in a network, such as network 125, via antenna 310.

Processing unit 315 may perform all data processing functions for inputting, outputting and processing of data including data buffering and device control functions. Memory 320 provides permanent, semi-permanent, or temporary working storage of data and instructions for use by processing unit 315 in performing processing functions. Memory 320 may include large-capacity storage devices, such as magnetic and/or optical recording devices. Output device(s) 325 may include conventional mechanisms for outputting data in video, audio and/or hard copy format. For example, output device(s) 325 may include a conventional display for viewing a geographic map and assorted text messages. Input device(s) 330 may permit entry of data into conduit location recording device 105. Input device(s) 330 may include, for example, a keyboard or a mouse.

Geo-location unit 335 may include a conventional device for determining a geolocation of sensed conduit markers 140. For example, geo-location unit 335 may include a Global Positioning System (GPS) receiver that can receive GPS signals and determine corresponding geo-locations.

Marker sensor 340 may include conventional sensors for identifying conduit markers 140 using one or more properties associated with the markers. Marker sensor 340 may, for example, identify conduit markers 140 through magnetic or electromagnetic properties associated with the markers. Marker sensor 340 may include any type of conventional magnetic and/or electromagnetic sensor, such as any of those disclosed in U.S. Pat. Nos. 6,229,445, 5,017,415, 5,114,517, 5,577,147, 6,092,558, 6,172,609, 5,430,379, or the like.

Bus 345 may interconnect the various components of conduit location recording device 105 and permit them to communicate with one another.

Exemplary GIS Server

Figure 4:
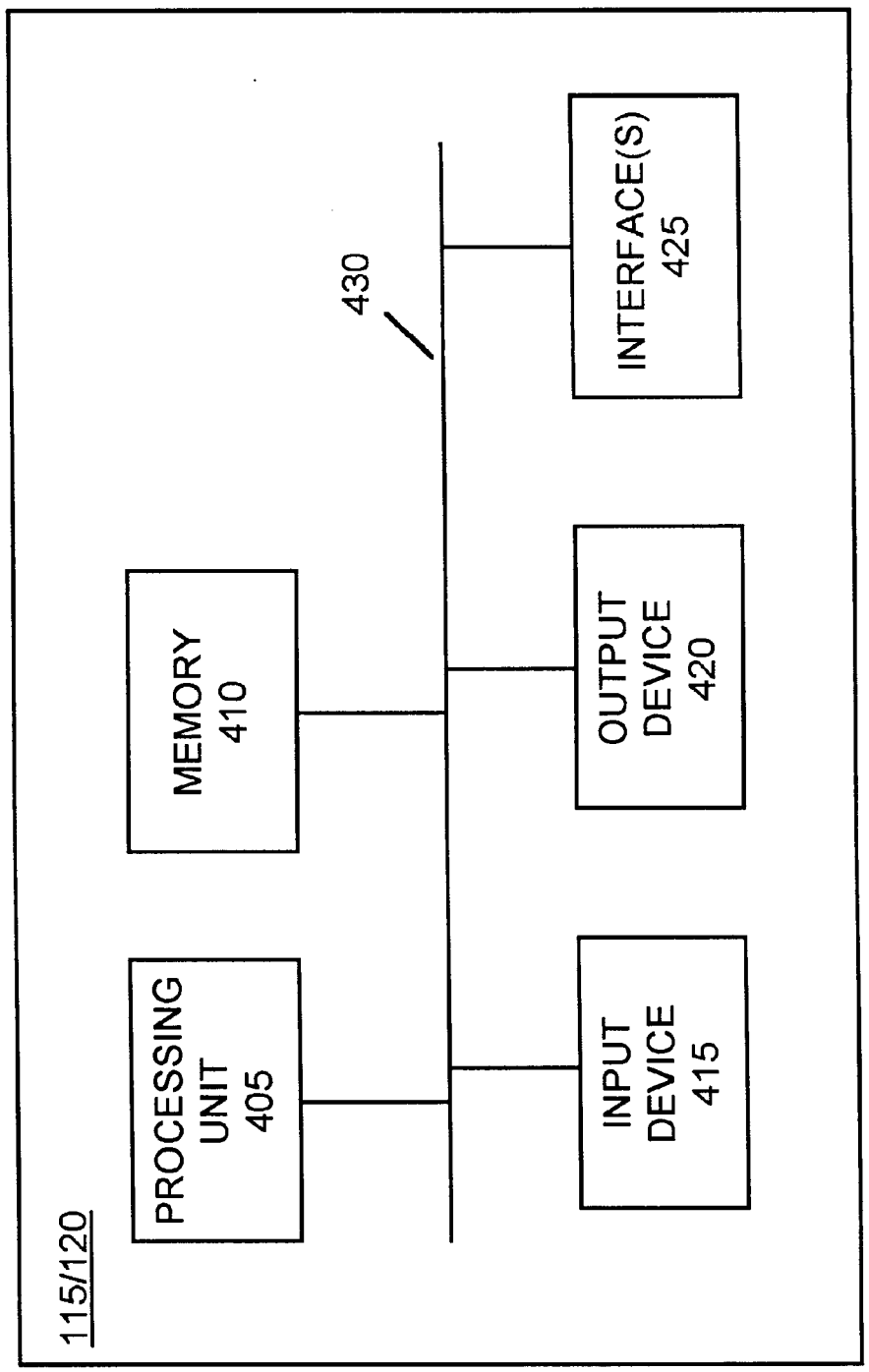
FIG. 4 illustrates exemplary components of a host/Geographic Information System (GIS) server consistent with the present invention.

FIG. 4 illustrates exemplary components of GIS server 115 consistent with the present invention. Host 120 may be similarly configured. GIS server 115 may include a processing unit 405, a memory 410, an input device 415, an output device 420, network interface(s) 425 and a bus 430. Processing unit 405 may perform all data processing functions for inputting, outputting, and processing of data. Memory 410 may include Random Access Memory (RAM) that provides temporary working storage of data and instructions for use by processing unit 405 in performing processing functions. Memory 410 may additionally include Read Only Memory (ROM) that provides permanent or semi-permanent storage of data and instructions for use by processing unit 405. Memory 410 can also include large-capacity storage devices, such as a magnetic and/or optical device.

Input device 415 permits entry of data into GIS server 115 and may include a user interface (not shown). Output device 420 permits the output of data in video, audio, or hard copy format. Network interface(s) 425 interconnect GIS server 115 with network 125. Bus 430 interconnects the various components of GIS server 115 to permit the components to communicate with one another.

Exemplary Conduit Location Recording/conduit Locating Device Database

Figure 5:
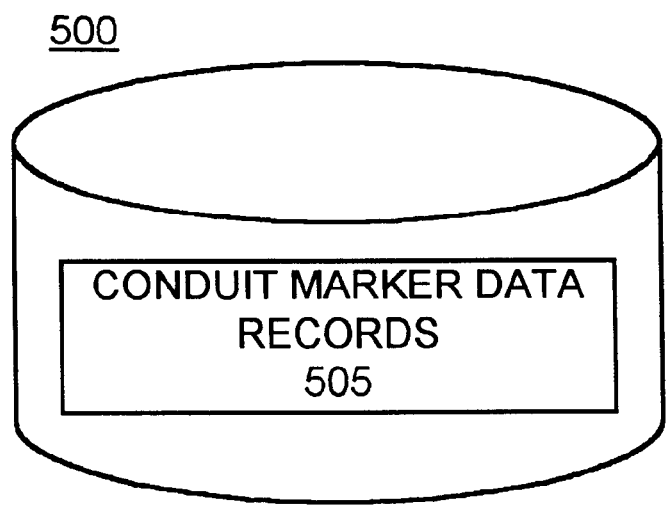
FIGS. 5 and 7 illustrate exemplary databases consistent with the present invention.

FIG. 5 illustrates an exemplary database 500 that may be stored in memory 320 of conduit location recording device 105 or conduit locating device 110. Database 500 may include conduit marker data records 505 associated with conduits 145 whose affixed conduit markers 140 have been sensed and their corresponding locations possibly recorded.

FIG. 6 illustrates an exemplary record 600 of conduit marker data records 505. Record 600 may include owner identifier data 605, conduit identifier data 610, conduit marker identifier data 615, marker geo-location data 620, and time stamp data 625.

Owner identifier data 605 may uniquely identify an entity that owns, operates and/or services the conduit identified by conduit ID 610. Conduit ID data 610 may uniquely identify a conduit 145 to which the conduit marker 140, identified by conduit marker ID 615, is affixed. Conduit marker ID data 615 may uniquely identify a particular conduit marker 140 affixed to a conduit 145. Marker geo-location data 620 may include a geo-location corresponding to the conduit marker 140 identified by conduit marker ID 615. Time stamp data 625 may include a time at which conduit marker ID 615 was sensed by either conduit location recording device 105 or conduit locating device 110.

Exemplary GIS Server Database

Figure 7:
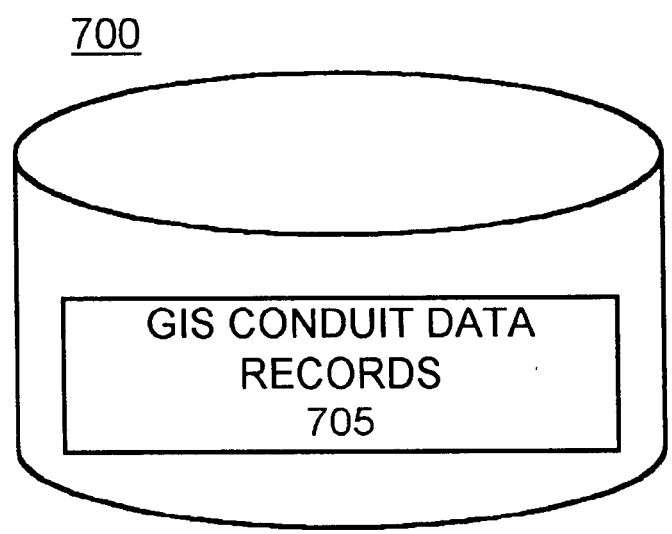

FIG. 7 illustrates an exemplary database 700 that may be stored in memory 410 of GIS server 115. Database 700 may include GIS conduit data records 705 associated with conduits 145 whose affixed conduit markers 140 have been sensed and their corresponding locations recorded.

FIG. 8 illustrates an exemplary record 800 of GIS conduit data records 705. Record 800 may include owner identifier data 605, conduit identifier data 610, conduit marker identifier data 615, marker geo-location data 620, time stamp data 625, conduit in-use status data 805, geo-data 810 and owner contact data 815.

Conduit in-use status data 805 may identify a use status of the conduit identified by conduit ID 610. For example, the conduit in-use state 805 of a currently operating gas line would indicate that the gas line was active and in-use.

Geo-data 810 may include map data of the geographic area surrounding the conduit identified by conduit ID 610. Geo-data 810 may include other information, such as, for example, the buried depth of the conduit identified by conduit ID 610.

Owner contact data 815 may identify one or more methods by which the owner or operator of the conduit identified by conduit ID 610 can be contacted. For example, owner contact data 815 may include a facsimile number, a pager number, an e-mail address, or a telephone number that may be used by GIS server 115 to contact the owner identified by owner ID 605.

Exemplary Conduit Location Recording Processing

Figure 9:
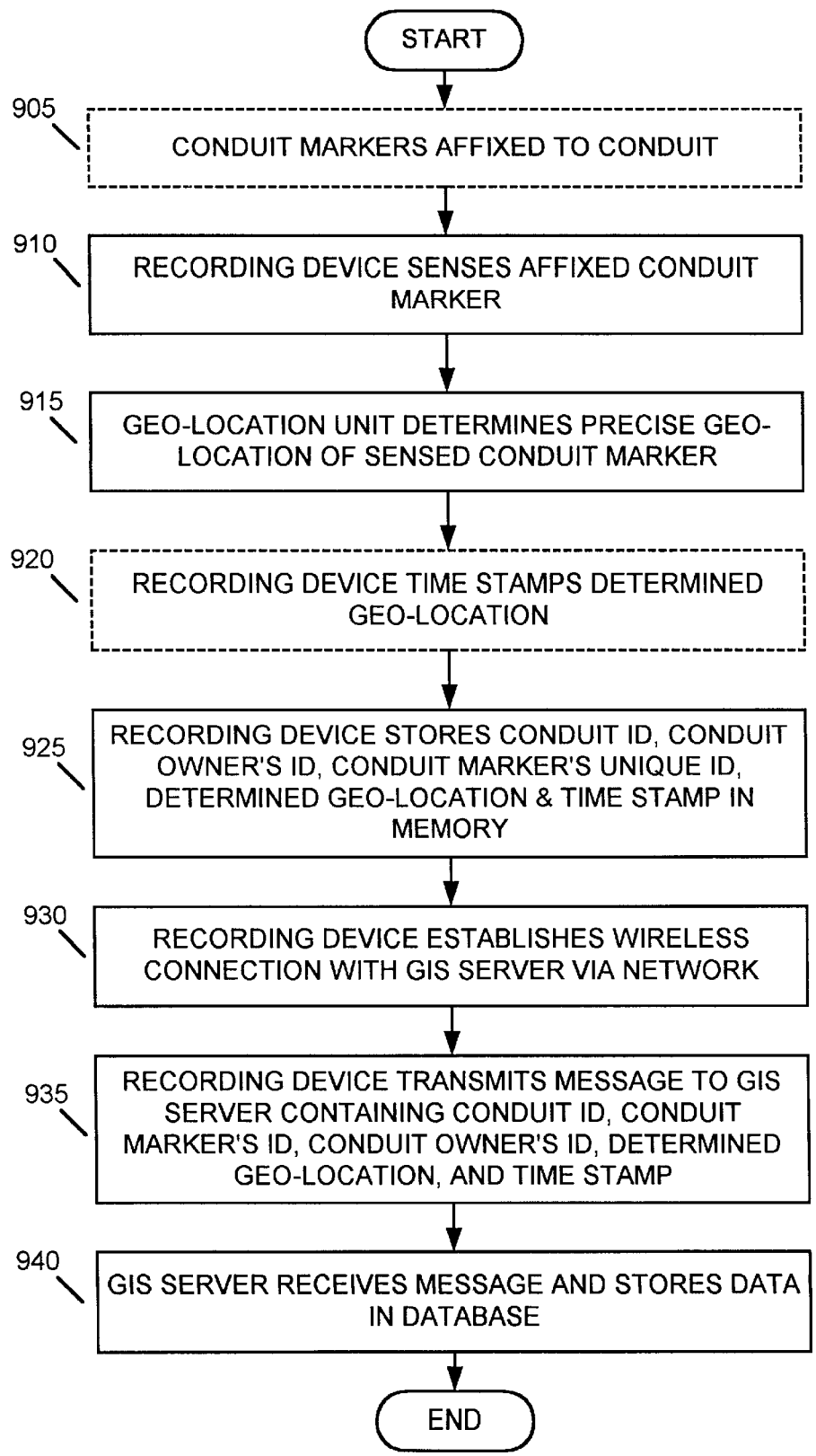
FIGS. 9-12 are flowcharts that illustrate exemplary system processing consistent with the present invention.

FIG. 9 is a flowchart that illustrates exemplary processing, consistent with the present invention, for determining and recording the location of identified markers affixed to a buried conduit. As one skilled in the art will appreciate, the method exemplified by FIG. 9 can be implemented as a sequence of instructions and stored in memory 320 of conduit location recording device 105 for execution by processing unit 315.

Before initiation of conduit location recording processing, conduit markers 140 may be attached to a conduit 145 [step 905]. Conduit markers 140 may be affixed to conduit 145 at regular intervals using manual or automatic mechanisms. For example, machinery that lays conduits may be modified to automatically affix conduit markers 140 to conduit 145 at specified intervals. Alternatively, such markers may be affixed as part of the manufacturing process for the conduit, or at other times prior to actual emplacement of the conduit. Conduit location recording device 105 may then sense an affixed conduit marker using magnetic and/or electromagnetic mechanisms [step 910]. Conduit location recording device 105 may, for example, be carried/transported over a geographic area with the marker sensor 340 in an active state. As conduit location recording device 105 moves over each conduit marker 140 affixed to the conduit 145, marker sensor 340 senses the unique identifier associated with the conduit marker 140.

Geo-location unit 235 may then determine a precise geo-location of the sensed conduit marker 140 [step 915]. If geo-location unit 335 includes a GPS receiver, for example, geo-location unit 335 can receive GPS signals and determine a geo-location in accordance with conventional techniques. Alternatively, conduit location recording device 105 may determine a geo-location of the sensed conduit marker 140 by requesting conventional "E-911" location services from a Public Land Mobile Network (PLMN). Such services may provide conduit location recording device 105 with a current geo-location. Additionally, conduit location recording device 105 may determine a geo-location of the sensed conduit marker 140 by performing triangulation of special signals transmitted by, for example, AM radio stations. Conduit location recording device 105 may, optionally, time stamp the determined geo-location, indicating the time at which conduit marker 140 was sensed and identified [step 920].

Conduit location recording device 105 may store a conduit identifier 610, a conduit owner identifier 605, a conduit marker identifier 615, a marker geo-location 620 and time stamp 625 in a record in database 500 [step 925]. Conduit identifier 610 and conduit owner identifier 605 may additionally be entered by a device operator via input device(s) 330 or retrieved from memory 320. Conduit location recording device 105 may then establish a wireless connection with GIS server 115 via network 125 [step 930]. Connection establishment with GIS server 115 may include conventional methods for securing data transmission, such as encryption and authentication. For example, conduit location recording device 105 and GIS server 115 may implement a conventional Virtual Private Network (VPN) using a security protocol such as IP security (IPSec). Such a security protocol may require user identification, such as, for example, password identification, before a connection may be established between conduit location recording device 105 and GIS server 115.

Subsequent to connection establishment, conduit location recording device 105 may transmit a message to GIS server 115 that may contain the conduit identifier 610, conduit owner identifier 605, conduit marker identifier 615, marker geo-location 620, and time stamp 625 [step 935]. GIS server 115 may receive the message and store the data contained therein in a record 800 of database 700 for future retrieval [step 940]. The operator of the conduit location recording device 105 may repeat this process for each conduit marker 140.

Exemplary Conduit Locating Device Processing

Figure 10:
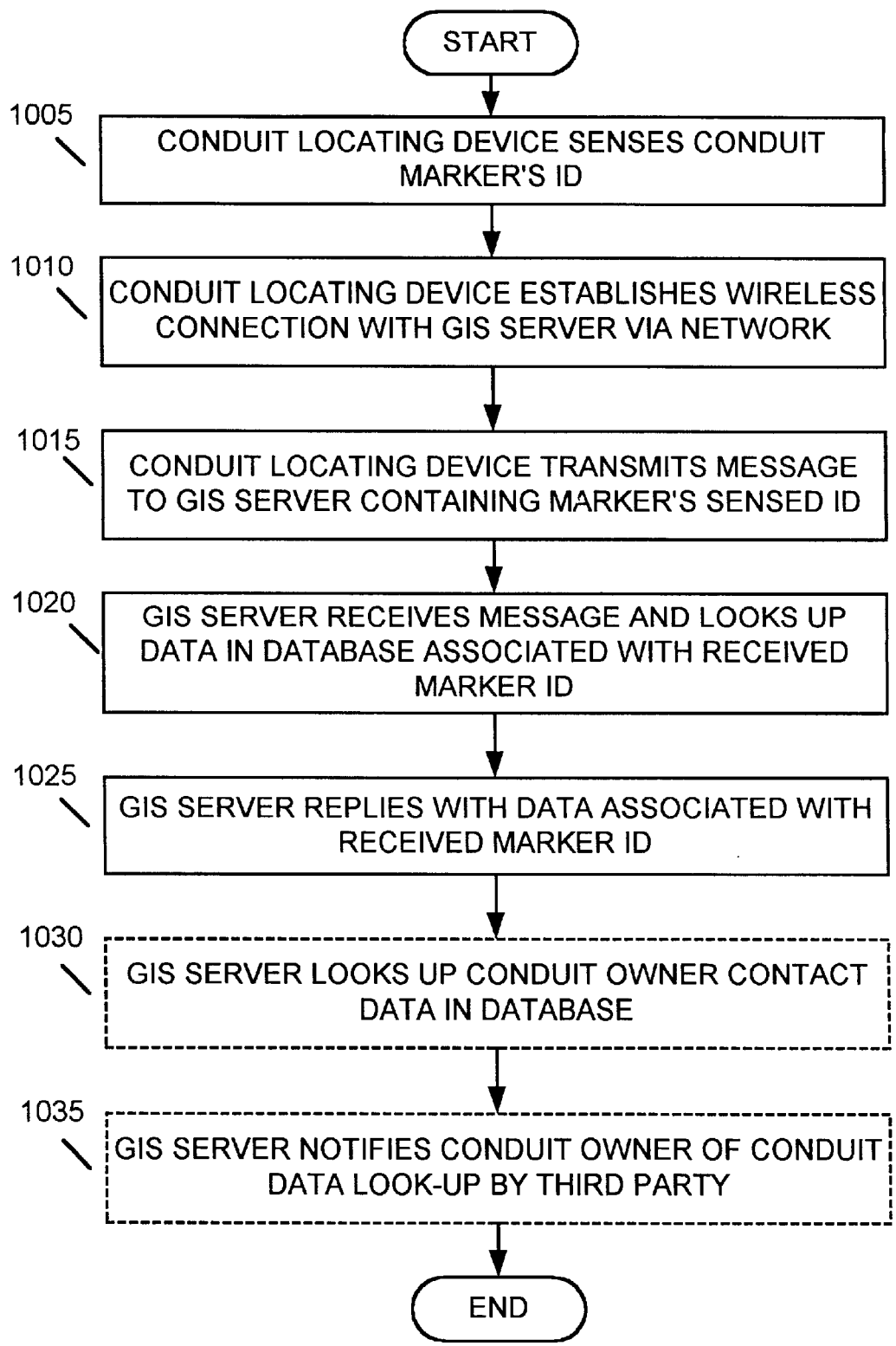

FIG. 10 is a flowchart that illustrates exemplary processing, consistent with the present invention, for locating markers affixed to a buried conduit and retrieving data related to the buried conduit from GIS server 115. As one skilled in the art will appreciate, the method exemplified by FIG. 10 can be implemented as a sequence of instructions and stored in memory 320 of conduit locating device 110 for execution by processing unit 315.

Conduit locating device 110 may begin processing by sensing a conduit marker's identifier using magnetic and/or electromagnetic mechanisms [step 1005]. Conduit locating device 110 may then establish a wireless connection with GIS server 115 via network 125 [step 1010]. Connection establishment with GIS server 115 may include conventional methods for securing data transmission, such as encryption and authentication. For example, conduit locating device 10 and GIS server 115 may implement a conventional VPN using a security protocol such as IPSec. Such a security protocol may require user identification, such as, for example, password identification, before a connection may be established between conduit locating device 110 and GIS server 115.

After establishment of a secure connection, conduit locating device 110 may transmit a message to GIS server 115 that may include the sensed marker's identifier (e.g., conduit marker ID 615) and a request for conduit data related to the sensed marker's identifier [step 1015]. GIS server 115 may receive the message and look up the requested conduit data associated with the received marker identifier in database 700 [step 1020]. For example, the conduit data request may include a request for owner ID data 605, conduit ID data 610, marker geo-location data 620, time stamp data 625, conduit in-use status data 805, and/or geo-data 810. GIS server 115 may reply with a reply message that may include the requested data associated with the received marker identifier [step 1025]. The reply message may include, for example, map data that allows an operator to immediately view, via output device(s) 325, a geographic area map that may further display a trajectory of the conduit corresponding to the sensed marker's identifier (e.g., conduit marker ID 615).

GIS server 115 may further, optionally, look up conduit owner contact data (e.g., owner contact data 815) in database 700 [step 1030]. GIS server 115 may also, optionally, notify the conduit owner of conduit data look-up by a third party using the conduit owner contact data [step 1035]. For example, GIS server 115 may look up owner contact data 815 and retrieve an e-mail address at which an owner and/or operator of the conduit corresponding to conduit marker ID 615 can be contacted. GIS server 115 may then automatically send an e-mail to the retrieved e-mail address notifying the owner and/or operator that a third party has requested data regarding the owner/operator's conduit, thus, possibly indicating that the third party may be excavating at the location of the conduit.

Exemplary Host Conduit Data Look-up Processing

Figure 11:
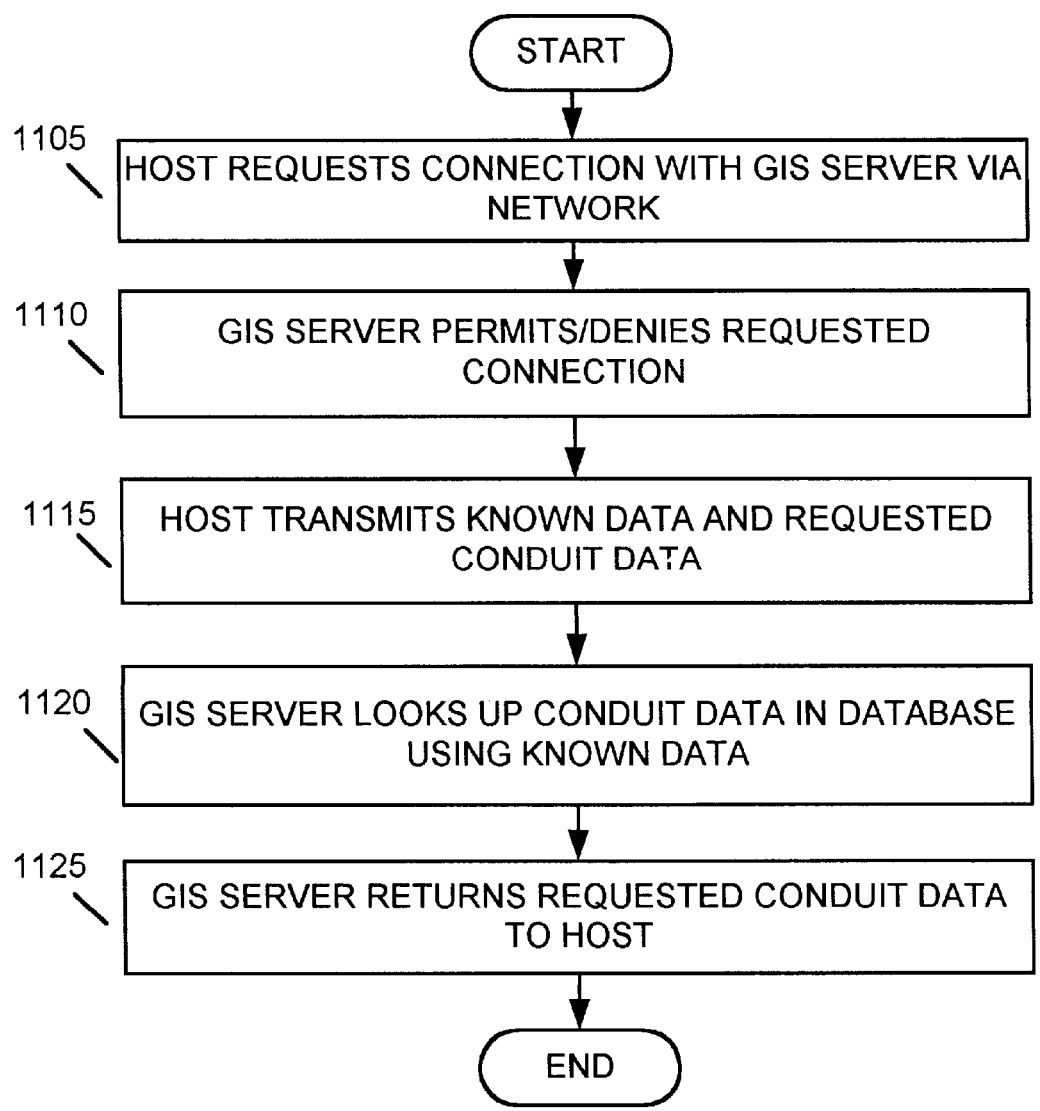

FIG. 11 is a flowchart that illustrates exemplary processing, consistent with the present invention, for host retrieval of conduit data from GIS server 115. As one skilled in the art will appreciate, the method exemplified by FIG. 11 can be implemented as a sequence of instructions and stored in memory 410 of host 120 for execution by processing unit 405.

To begin processing, host 120 may request a connection with GIS server 115 via network 125 [step 1105]. GIS server 115 may permit or deny the requested connection using conventional authentication techniques [step 1110]. The connection with GIS server 115 may be established using conventional methods for securing data transmission, such as encryption. For example, host 120 and GIS server 115 may implement a conventional VPN using a security protocol such as IPSec.

Subsequent to connection establishment, host 120 may transmit known data and requested conduit data to GIS server 115 [step 1115]. For example, host 120 may transmit known conduit identification data (e.g., conduit ID 610) and may request owner ID data 605, conduit in-use status data 805 and/or geo-data 810 from all records associated with the conduit identification data. GIS server 115 may look up conduit data in database 700 corresponding to the received known data [step 1120]. GIS server 115, for example, may look up all data records related to the known data (e.g., conduit ID 610) received from host 120. GIS server 115 may then return the requested conduit data to host 120 [step 1125].

Exemplary Host Conduit Data Update Processing

Figure 12:
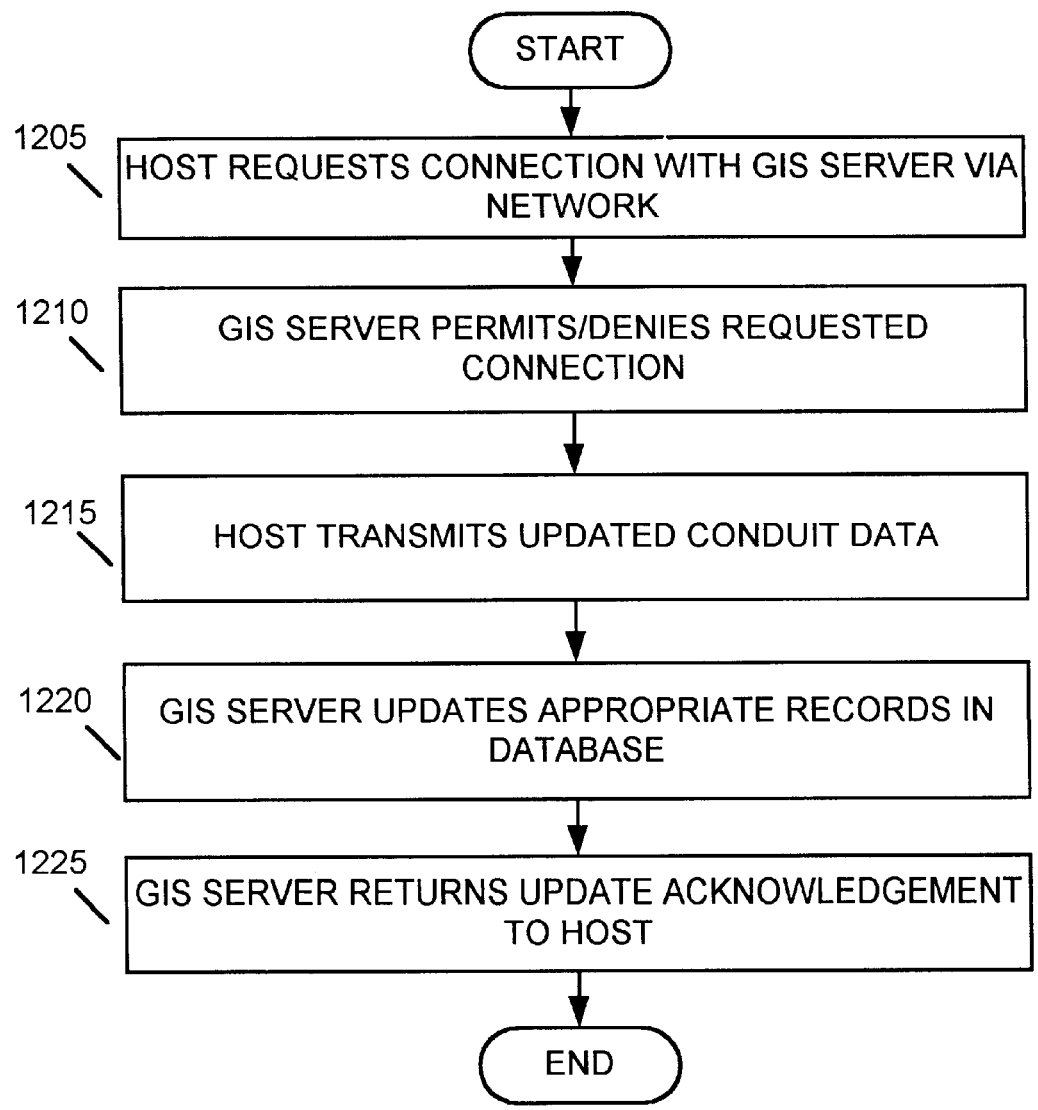

FIG. 12 is a flowchart that illustrates exemplary processing, consistent with the present invention, for host 120 update of conduit data stored in GIS server 115. As one skilled in the art will appreciate, the method exemplified by FIG. 12 can be implemented as a sequence of instructions and stored in memory 410 of host 120 for execution by processing unit 405.

Host 120 may begin processing by requesting a connection with GIS server 115 via network 125 [step 1205]. GIS server 115 may permit or deny the requested connection using conventional authentication techniques [step 1210]. The connection with GIS server 115 may be established using conventional methods for securing data transmission, such as encryption. For example, host 120 and GIS server 115 may: implement a conventional VPN using a security protocol such as IPSec.

After connection establishment, host 120 may transmit updated conduit data to GIS server 115 [step 1215]. For example, host 120 may update owner identification data (e.g., owner ID 605) and/or owner contact information (e.g., owner contact data 815) associated with a particular conduit (e.g., conduit ID 610). GIS server 115 may receive the transmitted data and update appropriate records in database 700 [step 1220]. GIS server 115 may then return an update acknowledgment message to host 120 [step 1225].

CONCLUSION

Systems and methods consistent with the present invention, therefore, provide mechanisms that can identify, locate and map subsurface objects, such as conduits that may include cables, pipes and ducts. Data related to the identified and located subsurface objects can be transmitted, via a wireless network, to a central data storage facility for storage. The stored data can be subsequently retrieved by interested entities, such as utility companies, that may be considering the excavation of a particular geographic area containing one or more subsurface objects.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 9-12, the order of the steps is not critical.

In addition, while the present invention has been described in relation to detecting conduits, the present invention may be used to detect any subsurface object. For example, a marker may be affixed to one or more subsurface objects that may then be detected, after burial, in the manner described above. Furthermore, while the conduit location recording device and the conduit locating device have been illustrated and described as separate devices, the functions of both of these devices may be performed by a single device.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of notifying an entity of a request for data relating to an underground object, comprising:

sensing the underground object, a unique identifier being associated with the sensed underground object;

transmitting to a data storage facility, via a communications network, a request for data related to the sensed underground object, the request comprising the unique identifier; and notifying the entity of the request for data, the notification comprising the unique identifier, wherein the notification comprises at least one of a facsimile, an e-mail, a phone message, and a page.

2. The method of claim 1, wherein the entity comprises an owner of the underground object.

3. The method of claim 1, wherein the data storage facility notifies the entity of the data request in response to receipt of the transmitted request for data.

4. A method of accessing data associated with underground objects, comprising:

receiving a plurality of messages, each message transmitted from a different one of a plurality of remote devices and comprising at least one underground object identifier;

retrieving data associated with the at least one underground object identifier of each of the plurality of messages; and sending the data to corresponding devices of the plurality of remote devices, wherein the data comprises at least one of owner identification data, geo-location data, and use status data associated with a respective underground object identifier, wherein the plurality of remote devices comprise underground object locating devices.

5. The method of claim 4, wherein the plurality of messages are received via a packet-switched network.

6. The method of claim 5, wherein the data is sent via a packet-switched network to each of the plurality of remote devices.

7. The method of claim 4, wherein the underground object locating devices comprise conduit locating devices.

8. The method of claim 4, further comprising:

notifying entities associated with each underground object identified by the underground object identifiers of the receipt of respective messages of the plurality of messages.

9. The method of claim 8, wherein notifying the entities comprises:

retrieving entity contact data associated with each of the entities, wherein the contact data comprises facsimile, e-mail, phone, or pager data; and notifying the entities using the retrieved contact data.

10. A server, comprising:

a memory;

a communication interface coupled to a packet-switched network and configured to receive a plurality of messages, each message transmitted from a different one of a plurality of remote devices and comprising at least one underground object identifier;

a processing unit configured to:

retrieve data associated with the at least one underground object identifier of each of the plurality of messages from the memory, and send the data, via the communication interface, to corresponding devices of the plurality of remote devices, wherein the data comprises at least one of owner identification data, geo-location data, and use status data associated with a respective underground object identifier and wherein the plurality of remote devices comprise underground object locating devices.

11. The server of claim 10, wherein the plurality of messages are received via the packet-switched network.

12. The server of claim 11, wherein the data is sent via the packet-switched network to each of the plurality of remote devices.

13. The server of claim 10, wherein the underground object locating devices comprise conduit locating devices.

14. The server of claim 10, the processing unit further configured to:

notify entities associated with each underground object identified by the underground object identifiers of the receipt of respective messages of the plurality of messages.

15. The server of claim 10, the processing unit further configured to:

retrieve entity contact data associated with each of the entities, wherein the contact data comprises facsimile, e-mail, phone, or pager data; and notify the entities using the retrieved contact data.

16. A method of maintaining a database related to a plurality of underground objects, comprising:

receiving, via a communications network, a plurality of messages, each message transmitted from a different one of a plurality of remote devices and comprising data associated with a corresponding one of the plurality of underground objects; and storing the data in the database, wherein the data comprises at least one of an underground object identification data, owner identification data, geo-location data and a time stamp and wherein the plurality of remote devices comprise underground object locating devices.

17. The method of claim 16, wherein the data further comprises at least one of contact data for contacting an owner of the corresponding one of the plurality of underground objects and an in-use status of the corresponding one of the plurality of underground objects.

18. The method of claim 16, wherein the communications network comprises a packet-switched network.

19. A server, comprising:

a database;

a communication interface coupled to a packet-switched network and configured to receive a plurality of messages, each message transmitted from a different one of a plurality of remote devices and comprising data associated with a corresponding one of a plurality of underground objects; and a processing unit configured to store the data in the database, wherein the data comprises at least one of an underground object identification data, owner identification data, geo-location data and a time stamp and wherein the plurality of remote devices comprise underground object locating devices.

20. The server of claim 19, wherein the data comprises at least one of contact data for contacting an owner of the corresponding one of the plurality of underground objects and an in-use status of the corresponding one of the plurality of underground objects.

21. A method of accessing data associated with underground conduits, comprising:

receiving a plurality of messages, each message transmitted from a different one of a plurality of remote devices and comprising at least one underground conduit identifier;

retrieving data associated with the at least one underground conduit identifier of each of the plurality of messages; and sending the data to corresponding devices of the plurality of remote devices, wherein the data comprises at least one of owner identification data, geo-location data, and use status data associated with a respective underground conduit identifier, wherein the plurality of remote devices comprise hosts.

22. A method of maintaining a database related to a plurality of underground objects, comprising:

receiving, via a communications network, a plurality of messages, each message transmitted from a different one of a plurality of remote devices and comprising data associated with a corresponding one of the plurality of underground objects; and storing the data in the database, wherein the data comprises at least one of underground object identification data, owner identification data, geo-location data and a time stamp and wherein the plurality of remote devices comprises hosts.

* * * * *